Feb. 2, 1965 W. G. COWAN 3,167,851
METHOD OF MAKING BOX-SECTION STRUCTURAL ELEMENTS
Filed Jan. 21, 1963
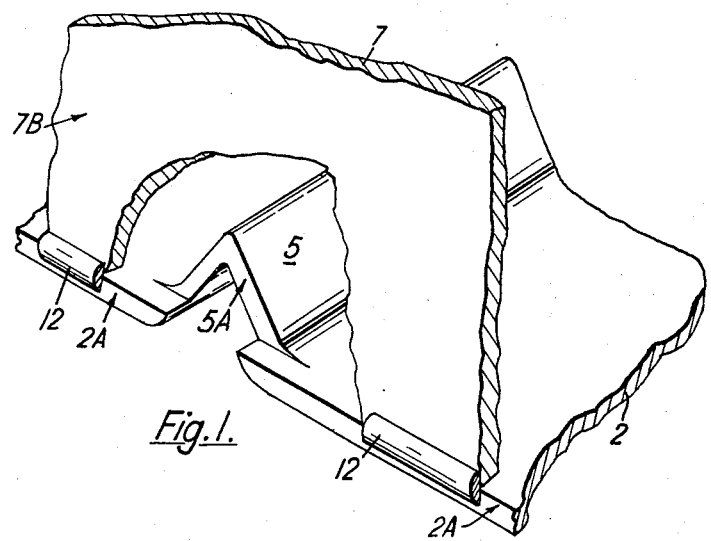
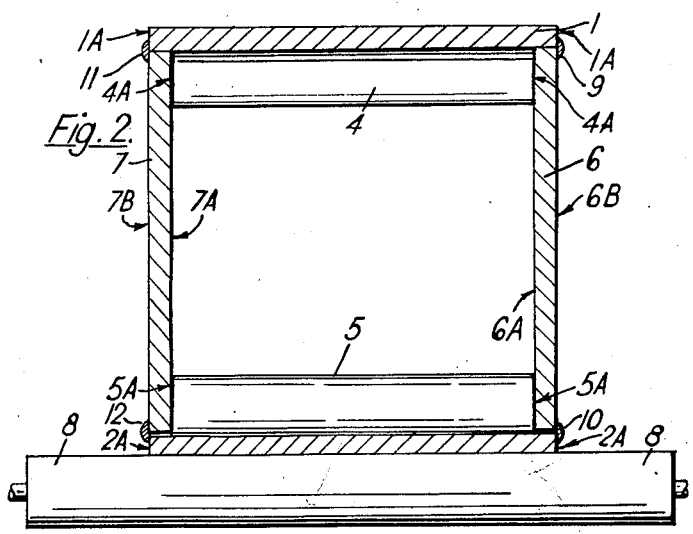
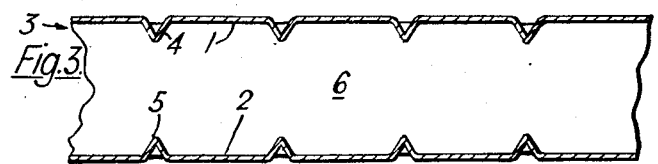
Inventor
WILLIAM GRAHAM COWAN
By Devin S. Thompson
Attorney United States Patent Office 3,167,851
Patented Feb. 2, 1965

3,167,851
METHOD OF MAKING BOX-SECTION
STRUCTURAL ELEMENTS
William Graham Cowan, East Kilbride, Scotland, assignor to J. H. Carruthers & Company Limited, East Kilbride, Scotland, a British company
Filed Jan. 21, 1963, Ser. No. 252,929
Claims priority, application Great Britain, Jan. 23, 1962, 2,383/62
4 Claims. (Cl. 29—155)

This invention relates to a method of manufacturing elongated hollow box-section structural members.

Usually an elongated hollow box-section structural member is constructed by welding together four component metal wall strips and other parts in successive welding operations, one for each component part to be secured. This method of construction is slow and laborious, and the cost of the resulting element is so high as to compare unfavourably with the cost of structural elements which are more easily produced e.g. rolled I-beams. Consequently, I-beams and the like as a rule supplant box-section elements in structural work, in spite of the near-ideal characteristics of the box section.

Moreover, an elongated hollow box-section structural member is usually provided with interior stiffening webs and ribs which are welded to the internal faces of the walls. Such strengthening is difficult to carry out, and increases the weight and cost of the member, and slows its manufacture.

The object of the invention is to provide a simple and speedy method of manufacturing an elongated hollow box-section structural member of the desired strength and of simplified, relatively light-weight construction.

According to the present invention, a method of manufacturing an elongated hollow box-section structural member including welding together four metal wall strips at their edges, comprises providing each strip of one pair of opposed strips with a longitudinal series of transverse ribs having their ends spaced inwards from the edges of the strip, erecting all four wall strips into a box-section structure with the pair of ribbed strips at the top and bottom and with the edges of the other pair of strips abutting the opposed faces of the ribbed strips, and the opposed faces of said other pair of strips abutting the ends of the ribs, and feeding the structure longitudinally through a welding machine to weld together at the corners of the structure all four strips simultaneously along the external joint lines at the sides of the structure.

An example embodying the invention will now be described with reference to the accompanying drawing in which FIG. 1 is a perspective view of part of FIG. 2 which shows a hollow box-section girder in course of manufacture, and FIG. 3 is a section on a horizontal plane of the completed girder.

Referring to the drawing:

A pair of metal strips 1 and 2 to form the vertical webs of the hollow box-section girder are passed through a machine (not shown) which deforms the metal of the strips to form on each strip 1, 2 a longitudinal series of spaced transverse V-section ribs 4, 5 respectively at right angles to the edges of the strip. The edges of the strip are notched at said longitudinally spaced locations so that the ends 4A, 5A of the ribs 4, 5 are spaced inwards from the edges 1A, 2A of the strip, a distance approximately equal to the thickness of each of the metal strips 6, 7 which are to form the horizontal flanges of the girder.

All four strips 1, 2, 6, 7 are then erected on a roller conveyor 8 (FIG. 2) to form a hollow box-section structure, the web strips 1, 2 of the structure being at the top and bottom, and the flange strips 6, 7 being at the sides.

The flange strips 6, 7 have their edges abutting the opposed faces of the web strips 1, 2, and have their opposed faces 6A, 7A abutting the ends 4A, 5A of the ribs and their outer faces 6B, 7B flush with the edges 1A, 2A of the web strips.

The conveyor 8 delivers the structure to a welding machine (not shown), being operable to feed the structure lengthwise continuously through the welding machine which has sets of guide rollers engaging the marginal portions of the strips to ensure correct interfitting of the strips prior to welding, and has four welding heads which operate simultaneously on the sides of the structure to weld along the external longitudinal joint lines between the strips. The four longitudinal welds are indicated at 9 to 12 in FIG. 2.

Thus, the entire welding operation is effected in a single pass through a welding machine, the girder so formed being adequately strengthened by the internal V-section ribs 4, 5. Difficult and time-consuming welding of internal strengthening ribs and webs is avoided, and the piecemeal welding together of the components in successive operations is also avoided. Mass production of the girders is made possible, and the relatively low cost of production means that hollow box-section structural members can now compete with rolled I or other section members for general structural work.

In a modification, the deformation of the webs forms on each web a series of longitudinally spaced channel-section ribs, the side walls of the channel diverging slightly towards the face of the web.

I claim:

1. A method of manufacturing an elongated hollow box-section structural member including welding together four metal wall strips at their edges, comprising providing each strip of one pair of opposed strips with a longitudinal series of transverse ribs having their ends spaced inwards from the edges of the strip, erecting all four wall strips into a box-section structure with the pair of ribbed strips at the top and bottom and with the edges of the other pair of strips abutting the opposed faces of the ribbed strips, and the opposed faces of said other pair of strips abutting the ends of the ribs, and feeding the structure longitudinally through a welding machine to weld together at the corners of the structure all four strips simultaneously along the external joint lines at the sides of the structure.

2. The method according to claim 1, wherein the foreshortened ribs are formed by deforming the strips at longitudinally spaced locations and notching the edges of the strips at said locations.

3. The method according to claim 2, wherein the notching is such that inward spacing of the rib ends from the edges of the ribbed strips is approximately equal to the thickness of each of said other pair of strips so that the outer faces of the latter are substantially flush with the edges of the ribbed strips.

4. A method according to claim 3, wherein the ribs are of V-section.

References Cited by the Examiner
UNITED STATES PATENTS

| | | | |
|---|---|---|---|
| 782,495 | 2/05 | Eichfeld | 189—41 |
| 1,880,003 | 9/32 | White et al. | 29—155 |
| 2,244,847 | 6/41 | Oeckl et al. | 29—155 |
| 2,979,806 | 4/61 | Macomber | 29—155 |
| 3,026,602 | 3/62 | Cvikl et al. | 29—155 |
| 3,092,222 | 6/63 | Heinle | 189—41 |

WHITMORE A. WILTZ, Primary Examiner.

RICHARD W. COOKE, Examiner.